United States Patent [19]

Cox et al.

[11] 3,842,349

[45] Oct. 15, 1974

[54] AUTOMATIC AC/DC RMS COMPARATOR

[75] Inventors: Louis G. Cox; Norbert L. Kusters; Malcolm P. MacMartin, all of Ottawa, Ontario, Canada

[73] Assignee: Canadian Patents and Development Limited, Ottawa, Ontario, Canada

[22] Filed: Aug. 7, 1973

[21] Appl. No.: 386,407

[52] U.S. Cl. ............... 324/98, 324/106, 324/132
[51] Int. Cl. ..... G01r 17/02, G01r 15/10, G01r 5/22
[58] Field of Search ............ 324/105, 106, 98, 102, 324/132; 321/1.5

[56] References Cited
UNITED STATES PATENTS

| | | | |
|---|---|---|---|
| 1,121,835 | 12/1914 | Hiatt | 324/98 |
| 2,805,394 | 9/1957 | Hermach | 324/106 |
| 2,896,165 | 7/1959 | Hornig et al. | 324/102 |
| 3,213,364 | 10/1965 | Miller et al. | 324/106 |
| 3,399,348 | 8/1968 | Praglin et al. | 324/106 |
| 3,521,164 | 7/1970 | Richman | 324/106 |

Primary Examiner—Alfred E. Smith
Assistant Examiner—Ernest F. Karlsen
Attorney, Agent, or Firm—Edward Rymek

[57] ABSTRACT

This invention is directed to an improved apparatus for the accurate comparison of an ac voltage with an accurate dc voltage standard to obtain the RMS value of the ac voltage. The voltages are alternately applied to the first heater of a differential multijunction thermal converter. The voltage generated by the converter is applied to a feedback circuit which includes a series connected amplifier, integrator and inverter and wherein the sum of the amplifier and inverter outputs is applied to the second heater in the converter. A pair of sample-and-hold circuits are alternately connected to the inverter output such that they obtain dc voltages representative of the ac and dc voltages respectively. The difference between the representative dc voltages is applied to a zero-centre meter or recorder.

16 Claims, 3 Drawing Figures

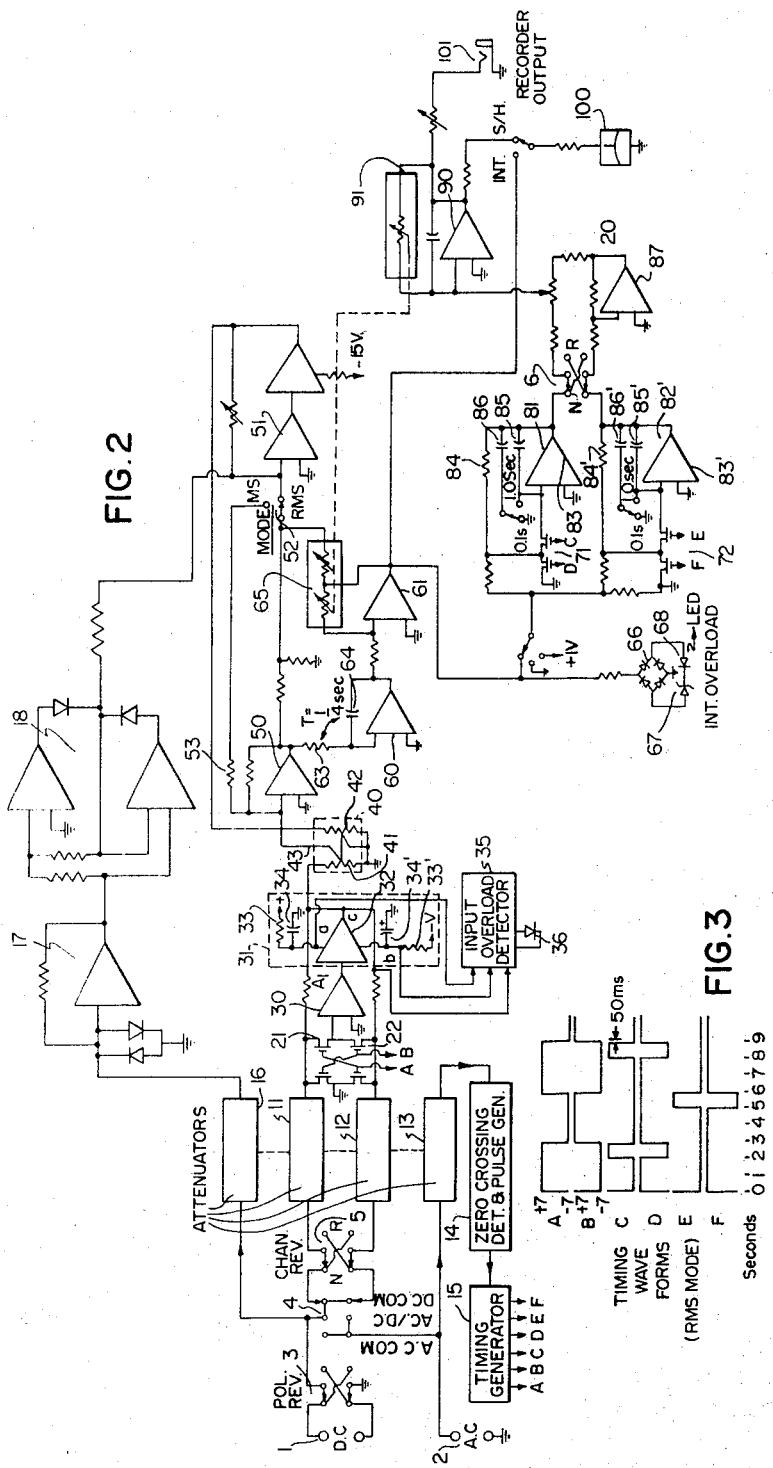

AUTOMATIC AC/DC RMS COMPARATOR

This invention relates to the accurate comparison of two voltages and more particularly to the measurement of an ac voltage by comparison with an accurate dc source.

Many methods and devices have been devised to measure ac voltages, the most common being a deflection type system. These systems suffer from a lack of accuracy, particularly when the ac voltage is not a pure sinewave or nearly so.

Presently the most reliable ac voltage measurements are taken using thermal transfer standards in which the ac voltage to be measured is applied to a thermoelement heater resulting in a dc output. The ac voltage is disconnected and a dc voltage standard is then applied to the same heater until the thermoelement output is equal to that previously obtained with the ac input. The dc voltage standard is then assumed to be equal to the RMS ac voltage since their heating effects are equal. The devices based on the above method, though accurate are complex and time consuming to operate.

It is therefore an object of this invention to provide an apparatus which will make ac measurements with a high degree of accuracy.

Another object of this invention is to provide an ac voltage measuring apparatus which will reduce the time required to make measurement.

These and other objects of the invention are achieved by providing an apparatus which includes a differential multi-junction thermal converter (MJTC). The MJTC has a first heater to which the ac voltage and an accurate dc voltagge are alternately applied producing an output voltage. A feedback circuit, having an integrator, is connected to the MJTC output and applies a signal to a second heater in the differential converter, driving the converter output to zero. Finally a pair of sample-hold circuits are alternately connected to the integrator output through a switch, such that they obtain a dc voltage representative of the ac and dc voltages respectively. The difference between these two dc voltages is applied to a zero centre meter or a recorder.

In the drawings:

FIG. 2 is a block diagram of the ac/dc comparator in its preferred embodiment; and FIG. 3 shows the timing waveforms applied to the various switches.

Figure 1:
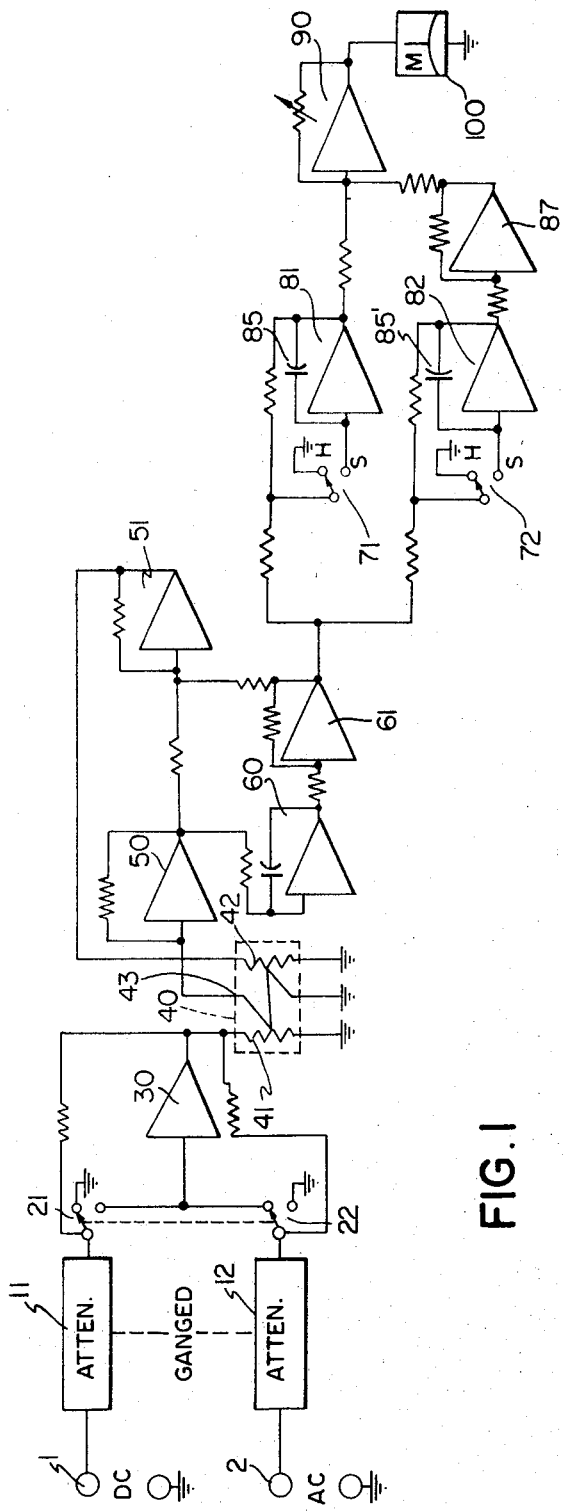
FIG. 1 is a simplified block diagram of the ac/dc comparator.

In a basic embodiment, as shown in FIG. 1, the ac/dc comparator includes input terminals 1 and 2 to which are connected an accurate dc voltage and the ac voltage to be measured respectively. The terminals are connected to precision ganged attenuators 11 and 12 which may have an input impedance of 1,000 ohms/v. The attenuators 11, 12 are connected to amplifier 30 through a pair of switches 21, 22, respectively, which alternately switch the amplifier input between the attenuators. The amplifier 30 output is connected to the first heater 41 of a differential multi-junction thermal converter 40 (MJTC). A typical MJTC may consist of a 200-turn constantin wire helix of triangular cross-section, having a twisted bifilar heater in each of two angles of the triangle, with the third angle thermally connected to a cold plate. The two segments of the helix between the heaters and the cold plate are plated with copper to constitute dissimilar-metal thermojunctionsat the heaters. The entire helix is in effect two hundred differential thermocouples in series, and the converter output is taken across the entire helix. The article "Differential multi-junction thermal converter" by A. J. Wilkins et al, Proc. IEEE Vol. 112 No. 4, April 1965, provides a detailed description of this type of converter. The thermal converter output 43 is fed to a dual channel feedback circuit which includes an amplifier 50 connected to an integrator-inverter circuit. Inverter 61 may follow integrator 60 as shown in FIG. 1, or it may be connected between amplifier 50 and integrator 60. The outputs of the amplifier 50 and the integrator-inverter circuit are summed by amplifier 51 which drives the second converter heater 42. The amplifier system thus contains two channels — a high gain fast channel which responds immediately to any change in the power level of heater 41, and effectively reduces the thermocouple response time by the gain of the fast amplifier 50 and the slow channel (60,61) which acts as a low pass filter to remove noise and harmonic content from the signal to be measured, and also acts as an almost infinite gain dc amplifier to reduce the differential thermal converter output 43 essentially to zero.

The inverter stage 61 provides the proper signal phase for summing the two channels, and also provides gain for the more sensitive ranges. If the slow channel should saturate on a more sensitive range because of a voltage change more than 10 times full scale, the fast channel takes over and provides the proper driving signal to the summing amplifier to maintain heater 42 voltage at the correct level. The output of the integrator 60 inverter 61 stage is also connected through a pair of switches 71 and 72, which each have sample (S) and hold (H) positions as shown in FIG. 1, to a pair of sample-hold circuits 81 and 82 having storing capacitors 85 and 85' respectively. The sample hold circuit 82 is followed by an inverter 87, such that amplifier 90 will see the difference between the two sample-hold circuit outputs. In addition amplifier 90 is a switched-gain amplifier permitting a read out device, such as the zero-centre meter 100, to have the followingg full-scale deflections: ±100 percent of rated input voltage, 10 percent 1 percent, 0.1 percent or 0.01 percent. If the scale has 25 divisions either side of centre, each division represents 0.0004 percent on the most sensitive scale.

As previously mentioned, the above apparatus is ideally suited to compare an ac voltage to an accurate dc standard thus obtaining the ac vms value with great precision, however the apparatus may also be used to compare two dc or two ac voltages with the same precision.

In operation, a dc voltage standard is applied to terminal 1 whereas the ac voltage to be measured is applied to terminal 2. Switches 21 and 22 are operated to alternately switch the dc voltage and ac voltage to amplifier 30 and thus to heater 41. The voltage gain of the amplifier is set such that with full input voltage on any range, the amplifier will supply the rated current to heater 41. After switch 21 is closed the circuit is allowed to settle for approximately two seconds and then switch 71 is moved to the sample position for approximately one second. In this switch position, the sample-hold circuit 81 is in a unity-gain configuration. When the switch 71 is returned to the hold (H) position the sampled voltage is stored in the capacitor 83. The S/H amplifier may have FET input stages, which produces a negligible droop during the hold period. Similarly S/H 82 samples inverter 61 output voltage when switch 22 is closed and this voltage is stored in capacitor 84 when the switch 72 opens again, the S/H 82 output voltage being inverted by means of unity gain inverter 85, and the difference between the two sample/hold outputs is displayed on a zero-centre meter 100.

In FIG. 2, which represents the preferred embodiment of the invention, the reference characters are the same as in FIG. 1 for corresponding elements. The dc voltage standard and the ac voltage to be measured are applied to terminals 1 and 2 respectively. A polarity reversing switch 3 is included in the dc circuit to check amplifier offset error since reversal error in the thermocouple 40 is indistinguishable from offset error in the input amplifier 30. Between terminals 1, 2 and attenuators 11, 12, a panel switch 4 is inserted which allows both channels to be commoned to either the ac or the dc input to check the channel balance, as well as operate in the normal ac/dc condition. In addition, a channel reversal switch 5 interchanges the connections from the input terminals to the attenuators 11, 12 and at the same time reverses a meter connecting switch 6, so that small variations in gain or off-set may be averaged. In addition to attenuators 11 and 12, the apparatus includes a third and a fourth attenuator, the input of the third attenuator is directly connected to the polarity reversal switch 3 and its output is connected to the input of an operational amplifier to be described later; the input of the fourth attenuator 13 is directly connected to the ac terminal 2 and its output is connected to the input of a zero crossing detector and pulse generator 14 which controls a timing generator 15. The timing generator 15 provides the timing waveforms of the type shown in FIG. 3 wherein waveforms A and B control switches 21 and 22 respectively and signals C-D and E-F control switches 71 and 72. The zero crossing detector is used to avoid transients on the thermal converter output when the heater 41 is switched between ac and dc voltages.

Attenuators 11 and 12 are connected to a pair of MOSFET switches 21, 22 which alternately switch the input of amplifier 30 between attenuator 11 and attenuator 12 under the control of timing generator 15. The FET switches automatically ground the virtual ground point of the channel not being sampled, maintaining a constant load impedance on the input terminals. FET switches and an input amplifier system were chosen rather than direct switching of the thermal converter between the two inputs. With a direct switching system, changeover times would be in the order of milliseconds, causing large transients in the thermal converter output and in the supplies being measured. With the present system, the quick-acting FET switches are at a virtual ground point, and the loads on the ac and dc sources do not change during changeover. The transients from the thermal converter are minimized, and converter heater protection can be provided easily. In addition, for maximum usefulness a high crest factor is necessary. The amplifier 30–32 has a maximum output voltage swing of about ±13 volts, so a converter heater requiring 1/10 of this voltage was chosen. This permits a crest factor of 10 at full rated input, and 30 at one-third of full input.

As previously described, the differential multi-junction thermal converter 40 includes a pair of heaters 41 and 42 and a converter output 43. This multijunction thermal converter 40 is run at a low temperature with the heaters only about 15°C above ambient, so 10 times rated heater input power normally will not damage them. A heater protection circuit 31 is used to limit the heater current. The collectors of complementary emitter followers in the power drive 32 are connected to the power supplies by resistors 33, 33' which limit the maximum steady current. Capacitors 34, 34' connected to the collectors will supply peak currents for crest factors of 10, but the maximum rms heater current under any conditions is limited to well within the safe limit.

For protection against input overload, a detection circuit 35 with an indicator light such as a light emitting diode 36 is included to sense impending saturation of the power drive 32. If either point $a$ or point $b$ is within 0.6 volts of point c, i.e., the voltage across the emitter-collectors, the LED 36 lights until the overload is cleared.

As previously described in conjunction with FIG. 1, amplifier 50 input is connected to the converter output 43, the amplified signal being applied to amplifier 60 which has an integrating circuit including resistor 63 and capacitor 64. The time constant for the integrating is preferably set at approximately ¼ second. The integrator output is connected to an inverter 61. The inverter gain may be varied by adjusting resistors 65 which are ganged to variable resistor 91 which controls amplifier 90.

To decrease the system noise level, it is advisable to switch the gain of inverting amplifier 61, so that on the four least sensitive ranges the output of the inverter 61 is ±1 volt for full scale deflection. This entails the risk of saturation of the integrator 60 if the voltage difference of the input signals is more than 10x the full scale sensitivity. To warn of the persistence of such a condition a detector circuit including a full wave rectifier 66, a zener diode 67 and a light emitting diode 68 are connected to the inverter 61 output and indicates an integrator overload condition.

The inverter 61 output signal and the amplifier 50 output signal are summed by amplifier 51 which drives heater 42 of the thermocouple, tending to reduce its output as previously described with regard to FIG. 1.

The sample and hold circuits 81, 82 are identical and include a switch 71(72) consisting of FET's which are controlled by the timing generator 15 and which periodically switch the input of the amplifier 83(83') to the output of inverter 61. The circuit further includes a resistor 84(84') and a capacitor 85(85') which provides a time constant of approximately 1/10 second, this is adeuate for all ranges except the 0.01 percent range. For this range, a second capacitor 86 (86') may be switched into the circuit to provide a time constant of approximately one second. However, when the long time constant is chosen, the comparator requires about 4–5 complete cycles to settle after one of the inputs changes by an amount equal to the full scale sensitivity, instead of a single cycle.

The sample and hold circuit outputs are connected through reversing switch 6. Switch 6 is ganged to switch 5 and provides for meter deflection in the same direction whether the apparatus is set for channel reverse or not. A unity-gain inverter 87 is connected into one channel of the reversingg switch 6 such that the difference between the two sample and hold circuits 81, 82 is applied to the switched-gain amplifier 90. The output of amplifier 90 is then detected by zero-centre meter 100 or may be recorded through recorder output 101.

With the circuit as described to this point, the sample and hold storage capacitors 85, 85', 86, 866' may operate at the full 10 volts. On the initial application of voltage, because of dielectric absorption in the storage capacitors, it requires some minutes to reach stable conditions on the most sensitive range. This defect was remedied by the addition of a circuit in FIG. 2 which includes an attenuator 16, a limiting amplifier 17 and a full wave operational rectifier 18 connected to the summing junction of amplifier 51. Because the voltage gains of the input amplifier 30 and the summing amplifier 51 are the same (on the 10 volt input range), this current derived from the direct input voltage supplies almost all of the steady input to amplifier 51, allowing the integrator to operate at almost zero voltage level and consequently the sample and hold circuits (81, 82) operate at essentially zero voltage.

This has several advantages, such as:

1. The storage capacitors of the sample and hold circuits are also operating at almost zero level, minimizing the effect of dielectric adsorption of these capacitors, which would greatly increase the time necessary to achieve stable condition after initial application of the input voltages.

2. With the integrator output level at almost zero, it is possible to employ voltage gain in the inverter stage before the sample and hold circuits, thereby increasing system signal-to-noise ratio.

3. Thermal converters may be changed without the necessity for external instrumentation or calibration. If the regular panel meter on the instrument is switched to integrator output instead of sample and hold, it is merely necessary to adjust the gain of summing amplifier 51 until the integrator output becomes zero, with rated dc applied to both input channels and calibration will be correct.

As described to this point the circuit operates in a linear (RMS) mode, i.e., the voltage on heater 42 tracks the applied voltage on heater 41, so the meter 100 deflection is a linear function of the difference between the rms values of the ac and dc input voltages.

A further feature of this invention provides for operation in a square-law (MS) mode as well. A mode switch 52 is provided which decouples the amplifier 50 and inverter 61 outputs from amplifier 51 to the thermocouple output through an appropriate resistor 53 providing a feedback to amplifier 50. In the MS mode heater 42 is energized by the dc input voltage with no direct feedback, the integrator 60 output instead being fed back to the input of the thermocouple amplifier 50, so the meter deflection is proportional to $E_{dc}^2 - E_{ac}^2$, the relative difference in power if both input voltages were applied to the same value of load resistance.

As described above in FIGS. 1 and 2, the accurate dc voltage at terminal 1 and the ac voltage to be measured at terminal 2 are connected through ganged alternators 11, 16 and 12, 13 respectively, with the accurate dc voltage being variable over a large voltage range such that balance may be achieved for a variety of ac voltages. To provide an apparatus in which the dc voltage need be variable over a range of approximately 3 to 10 volts only, the ac input terminal 2 may be connected to a tapped inductive voltage divider. The tap positions are chosen so that the divider output voltage is between 3 and 10 volts rms. In addition, alternators 11, 12, 13 and 16 may be replaced by fixed resistors. When the comparator is balanced, the rms value of the ac input voltage will be N times the accurate dc voltage, where N is the division ratio of the inductive voltage divider.

We claim:

1. An apparatus for comparing a first voltage to a second voltage comprising:
   a differential thermal converter means having a first and a second heater;
   first switch means for alternately connecting the first voltage and the second voltage to the first heater;
   first amplifier means coupled to the thermal converter;
   integrator-inverter means coupled to the first amplifier means;
   means for summing the outputs of the amplifier means and the integrator-inverter means;
   means for coupling the summing means to the second heater;
   first and second sample-and-hold means;
   second switch means for alternately connecting the first and second sample-and-hold means to the integrator-inverter means output in synchronism with said first switch means; and
   means coupled to the first and second sample-and-hold means for providing the difference between the two sample-and-hold outputs.

2. An apparatus as claimed in claim 1 in which the thermal converter means is a differential multijunction thermal converter.

3. An apparatus as claimed in claim 1 in which the second voltage is a precision dc voltage.

4. An apparatus as claimed in claim 3 which further includes a series connected limiting amplifier and full-wave operational rectifier means having an input coupled to the dc voltage and an output coupled to the input of the summing means.

5. An apparatus as claimed in claim 1 in which further includes generator means for providing switching signals to the first and second switch means.

6. An apparatus as claimed in claim 5 in which said first and second switch means are mosfet switches.

7. An apparatus as claimed in claim 6 in which said first voltage is an ac voltage and said generator means includes a zero crossing detector coupled to the ac voltage; and a timing generator coupled to the detector to provide timing signals to the mosfet switches in synchronism with the ac voltage.

8. An apparatus as claimed in claim 6 in which amplifier means is coupled between the first switch means and the first heater.

9. An apparatus as claimed in claim 1 in which the means for providing the difference between the two sample-and-hold circuits includes a unity gain inverter means coupled to the first sample-and-hold means;
   a third amplifier means coupled to the outputs of the inverter means and the second sample-and-hold means; and
   zero-centre meter means coupled to the third amplifier means.

10. An apparatus for comparing a first voltage to a dc voltage comprising:
    a differential thermal converter means having a first and a second heater;

first switching means for alternately connecting the first voltage and the dc voltage to the first heater;
a series connected limiting amplifier and full wave operational rectifier means having an input coupled to the dc voltage and an output coupled to the second heater;
second amplifier means coupled to the thermal converter output;
integrator-inverter means coupled to the second amplifier means;
means for summing the output of the second amplifier means and the integrator-inverter means;
means for coupling the summing means to the input of the second amplifier means;
first and second sample-and-hold means;
second switch means for alternately connecting the first and second sample-and-hold means to the output of the integrator-inverter means in synchronism with said first switch means; and
means coupled to the sample-and-hold means for providing the difference between the two sample-and-hold outputs.

11. An apparatus as claimed in claim 10 in which the thermal converter means is a differential multijunction thermal converter.

12. An apparatus as claimed in claim 10 which further includes generator means for providing switching signals to the first and second swtich means.

13. An apparatus as claimed in claim 12 in which said first and second switch means are mosfet switches.

14. An apparatus as claimed in claim 13 in which said first voltage is an ac voltage and said generator means includes — a zero crossing detector coupled to the ac voltage; and — a timing generator coupled to the detector to provide timing signals to the mosfet switches in synchronism with the ac voltage.

15. An apparatus as claimed in claim 13 in which amplifier means is coupled between the first switch means and the first heater.

16. An apparatus as claimed in claim 10 in which the means for providing the difference between the two sample-and-hold circuits includes — a unity gain inverter means coupled to the first sample-and-hold means;
a third amplifier means coupled to the outputs of the inverter means and the second sample-and-hold means; and
zero-centre meter means coupled to the third amplifier means.

* * * * *